(12) United States Patent
Park et al.

(10) Patent No.: US 8,699,618 B2
(45) Date of Patent: Apr. 15, 2014

(54) METHOD FOR GENERATING PLURALITY OF DM-RS SEQUENCES, COMMUNICATION TERMINAL DEVICE USING SAME, AND BASE STATION USING SAME

(75) Inventors: Kyoungmin Park, Goyang-si (KR); Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 48 days.

(21) Appl. No.: 13/504,898

(22) PCT Filed: Nov. 2, 2010

(86) PCT No.: PCT/KR2010/007638
§ 371 (c)(1),
(2), (4) Date: Apr. 27, 2012

(87) PCT Pub. No.: WO2011/053085
PCT Pub. Date: May 5, 2011

(65) Prior Publication Data
US 2012/0213311 A1 Aug. 23, 2012

(30) Foreign Application Priority Data
Nov. 2, 2009 (KR) .................. 10-2009-0105217

(51) Int. Cl.
*H04L 27/00* (2006.01)
(52) U.S. Cl.
USPC ............ 375/295; 375/133; 370/335; 370/344

(58) Field of Classification Search
USPC .......... 370/315, 329, 332; 375/295, 299, 316; 455/446, 509
See application file for complete search history.

(56) References Cited

U.S. PATENT DOCUMENTS

| | | | |
|---|---|---|---|
| 2008/0080472 A1* | 4/2008 | Bertrand et al. | 370/344 |
| 2008/0232325 A1 | 9/2008 | Mehta et al. | |
| 2008/0318608 A1 | 12/2008 | Inoue et al. | |
| 2009/0046645 A1 | 2/2009 | Bertrand et al. | |
| 2009/0110114 A1 | 4/2009 | Onggosanusi et al. | |
| 2010/0246638 A1* | 9/2010 | Mehta et al. | 375/133 |
| 2011/0085519 A1* | 4/2011 | Koivisto et al. | 370/335 |

OTHER PUBLICATIONS

International Search Report of PCT/KR2010/007638 dated Jun. 23, 2011.

* cited by examiner

*Primary Examiner* — Leon-Viet Nguyen
(74) *Attorney, Agent, or Firm* — H.C. Park & Associates, PLC (57) ABSTRACT

The present invention relates to a method for generating a plurality of demodulation reference signal (DM-RS) sequences, a communication terminal device using same, and a base station using same, which generate N DM-RS sequences by adding additional parameters having N ($\geq 2$) values or N numbers of cases after designing a basic DM-RS sequence for one or more layers. Thereby, each terminal can easily obtain layer information assigned thereto except for basic precoder information from DM-RS and can further predict interference and the like among terminals by obtaining layer information of other terminals.

4 Claims, 11 Drawing Sheets

METHOD FOR GENERATING PLURALITY OF DM-RS SEQUENCES, COMMUNICATION TERMINAL DEVICE USING SAME, AND BASE STATION USING SAME

CROSS-REFERENCE TO RELATED APPLICATIONS

This application is the National Stage Entry of International Application No. PCT/KR2010/007638 filed on Nov. 2, 2010 which claims priority from and the benefit of Korean Patent Application No. 10-2009-0105217 filed on Nov. 2, 2009, both of which are herein incorporated by reference for all purposes as if fully set forth herein.

BACKGROUND

1. Field

The present invention relates to a radio communication system, and more particularly, to a method for a transmitting end to generate and use a plurality of demodulation reference signals (DM-RSs) so as to report a structure of a precoder to a receiving end in a radio communication system that transmits and receives information through use of a multiple input multiple output (MIMO) antenna.

2. Discussion of the Background

As communication systems have developed, various wireless terminals have been utilized by consumers, such as companies and individuals.

A current mobile communication system, for example, 3GPP, Long Term Evolution (LTE), LTE-Advanced (LTE-A), and the like, may be a high capacity communication system capable of transmitting and receiving various data such as image data, wireless data, and the like, beyond providing a sound-based service. Accordingly, there is a desire for a technology that transmits high capacity data, which is comparable with a wired communication network. Also, the system is required to include an appropriate error detection scheme that increases transmission efficiency of the system so as to improve performance of the system.

In the communication system, a demodulation reference signal (DM-RS) may be used to report, to a receiving apparatus, information associated with a precoder used by a transmitting apparatus for information transmission.

Both a transmitting end and a receiving end of the communication system use a multiple input multiple output (MIMO) antenna, and a different DM-RS may need to be transmitted to each layer where a user equipment (UE) transmits or receives a signal.

In general, a layer refers to an independent information stream of simultaneously transmitted different pieces of information, and a rank refers to a number of layers or a maximum number of layers that can be simultaneously transmitted.

Although a process of mapping a DM-RS, different for each layer, to a transmission block or a resource block has been discussed, specifications have not yet been determined.

In particular, there is a drawback in that an effective multiple access environment may not be provided through use of merely a conventional cell-specific DM-RS sequence in a multi-user MIMO environment where UEs access a single base station.

SUMMARY

Accordingly, the present invention has been made to solve the above-mentioned problems occurring in the prior art, and an object of the present invention is to provide a method for generating a plurality of DM-RS sequences (N DM-RS sequences).

Another object of the present invention is to provide a method that may design a plurality of DM-RS sequences for distinguishing UEs and may enable each UE to readily obtain layer information.

Another object of the present invention is to provide a method that may enable each UE to obtain information associated with a layer and precoder used by another UE.

Another object of the present invention is to provide a method that may provide a UE-specific DM-RS signal or a UE-specific DM-RS sequence so as to remove a separate signaling to report a layer allocated to a UE.

In order to accomplish this object, there is provided a method of generating a plurality of demodulation-reference signal (DM-RS) sequences, the method including generating N DM-RS sequences by adding an additional parameter having N values or N events to a basic DM-RS sequence for one or more layers, N being greater than or equal to 2.

In accordance with another aspect of the present invention, there is provided a communication user equipment (UE) that obtains precoder information from a reference signal (RS) transmitted from a base station (BS), and the UE receives a UE-specific DM-RS sequence, which is transmitted after being generated by additionally allocating a UE-specific orthogonal code sequence to a resource element (RE) to which a basic DM-RS sequence for each layer is allocated, generates the basic DM-RS sequence for each layer by correlating the received UE specific DM-RS sequence and a layer-specific Walsh code sequence, and obtains a layer allocated to the UE and precoder information used in the allocated layer, by correlating the generated basic DM-RS sequence for each layer and a UE-specific orthogonal code sequence allocated to the UE.

In accordance with another aspect of the present invention, there is provided a BS that generates and transmits a DM-RS, and the BS designs a basic DM-RS sequence for one or more layers, adds an additional parameter having N values or N events to the basic DM-RS sequence so as to generate N DM-RS sequences, and transmits the N DM-RS sequences, N being greater than or equal to two.

A method of obtaining precoder information from an RS transmitted from a BS, the method including receiving a UE-specific DM-RS sequence that is transmitted after being generated by additionally adding a UE-specific orthogonal code sequence to an RE to which a basic DM-RS sequence for each layer is allocated, generating the basic DM-RS sequence for each layer by correlating the received UE-specific DM-RS sequence and a layer-specific Walsh code sequence, and obtaining an allocated UE and precoder information used in the allocated layer, by correlating the DM-RS sequence for each layer and an allocated UE-specific orthogonal code sequence.

DETAILED DESCRIPTION OF EXEMPLARY EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
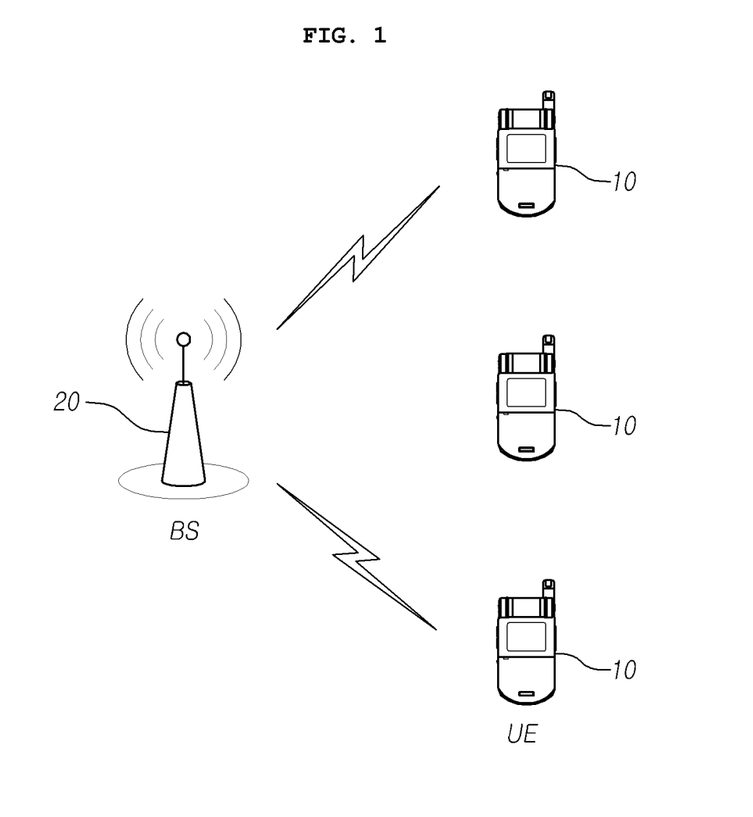
FIG. 1 is a diagram illustrating a radio communication system according to an exemplary embodiment of the present invention.

FIG. 1 illustrates a radio communication system according to an exemplary embodiment of the present invention.

The radio communication system may be widely installed so as to provide various communication services, such as a voice service, packet data, and the like.

Referring to FIG. 1, the radio communication system may include a user equipment (UE) 10 and a base station (BS) 20. A method of generating a plurality of demodulation reference signal (DM-RS) sequences and a method of obtaining information associated with a layer along with precoder information for each UE through use of the generated plurality of DM-RS sequences, without additional signaling to report the information associated with the layer may be applied to the UE 10 and the BS 20, which will be described in detail with reference to the descriptions provided from FIG. 2.

Throughout the specifications, the UE 10 may be an inclusive concept indicating a user terminal utilized in a radio communication, including a UE in WCDMA, LTE, HSPA, and the like, and a mobile station (MS), a user terminal (UT), a subscriber station (SS), a wireless device, and the like in GSM.

In general, the BE 20 or a cell may refer to a fixed station where communication with the UE 10 is performed, and may also be referred to as a Node-B, an evolved Node-B (eNB), a base transceiver system (BTS), an access point, a relay node, and the like.

The BS 20 or the cell may be construed as an inclusive concept indicating a portion of an area covered by a base station controller (BSC) in CDMA, a Node B in WCDMA, and the like, and the concept may include various coverage areas, such as a megacell, macrocell, a microcell, a picocell, a femtocell, a communication range of a relay node, and the like.

The UE 10 and the BS 20 are used as two inclusive transceiving subjects to embody the technology and technical concepts described in the specifications, and may not be limited to a predetermined term or word.

A multiple access scheme applied to the radio communication system is not limited. The radio communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like.

Uplink (UL) transmission and downlink (DL) transmission may be performed based on a time division duplex (TDD) scheme that performs transmission based on different times, or based on a frequency division duplex (FDD) scheme that performs transmission based on different frequencies.

An exemplary embodiment of the present invention may be applicable to resource allocation in an asynchronous radio communication scheme that is advanced through GSM, WCDMA, and HSPA, to be LTE and LTE-advanced, and may be applicable to resource allocation in a synchronous radio communication scheme that is advanced through CDMA and CDMA-2000, to be UMB. Exemplary embodiments of the present invention may not be limited to a specific radio communication scheme, and may be applicable to all technical fields to which a technical idea of the present invention is applicable.

According to an exemplary embodiment of the present invention, a radio communication system may support UL and/or DL HARQ, and may use a channel quality indicator (CQI) for link adaptation. Also, a multiple access scheme for a DL and a multiple access scheme for a UL may be different from each other. For example, the DL may use an OFDMA scheme, and the UL may use a single carrier-frequency division multiple access (SC-FDMA) scheme.

Layers of radio interface protocol between a UE and a network may be distinguished into a first layer (L1), a second layer (L2), and a third layer (L3), based on three lower layers of a well-known open system interconnection (OSI) model in a communication system, and a physical layer of the L1 may provide an information transfer service through use of a physical channel.

According to an exemplary embodiment of the present invention, in a radio communication system, for example, a single radio frame may be formed of ten subframes and a single subframe may be formed of two slots.

A basic unit for data transmission may be a subframe, and UL scheduling or DL scheduling may be performed based on a subframe unit. A single slot may include a plurality of OFDM symbols in a time domain, and may include at least one subcarrier in a frequency domain, and a single slot may include 7 or 6 OFDM symbols.

For example, when a subframe is formed of two time slots, each time slot includes 7 symbols in a time domain and 12 subcarriers in a frequency domain. Although a time-frequency domain defined to be a single slot as described in the foregoing may be referred to as a resource block (RB), it may not be limited thereto.

Figure 2:
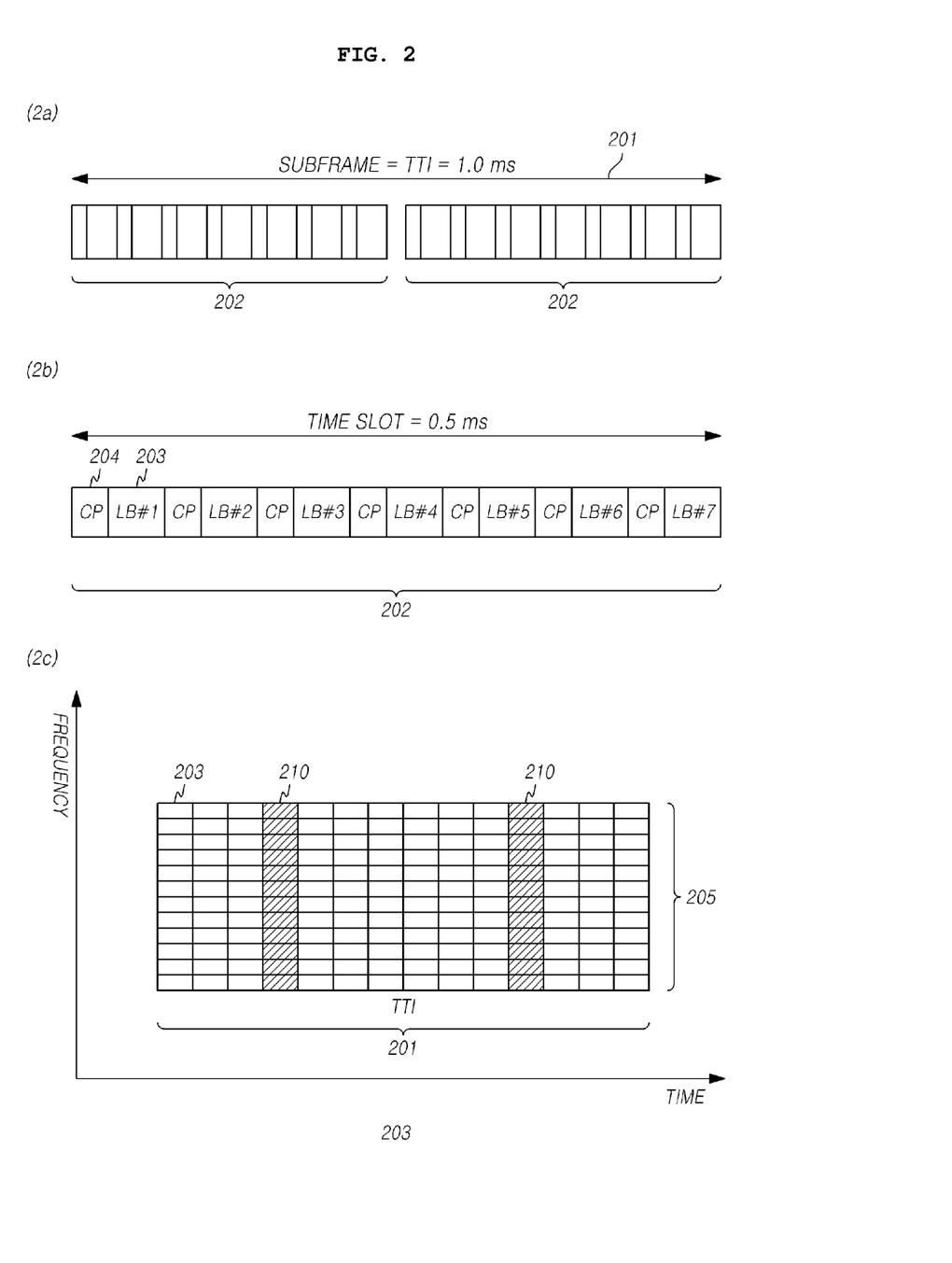
FIG. 2 is a diagram illustrating a general structure of a sub-frame and a time slot of transmission data according to an exemplary embodiment of the present invention.

FIG. 2 illustrates a general structure of a sub-frame and a time slot of transmission data according to an exemplary embodiment of the present invention.

In 3GPP LTE and the like, a transmission time of a frame may be divided based on a transmission time interval (TTI) of 1.0 ms duration. "TTI" and "subframe" may be directed to the same meaning, and a frame having a length of 10 ms may include 10 TTIs.

FIG. 2b illustrates a structure of a time-slot according to an exemplary embodiment of the present invention. As described in the foregoing, the TTI may be a basic transmission unit, and a single TTI may include two time slots 202 of the same length and each time-slot has a duration of 0.5 ms. The time-slot may include seven long blocks (LBs) 203 associated with symbols. The LBs may be separated by cyclic prefixes (CPs) 204. Although a single TTI or a subframe may include 14 LB symbols, exemplary embodiments of the present invention may not be limited to the structure of the frame, the subframe, or the time-slot as described in the foregoing.

FIG. 2C illustrates a configuration of the single RB 230 during a single subframe or the TTI 201 according to an exemplary embodiment of the present invention. Each TTI or each subframe may be divided into 14 LBs 203 in a time domain. Each LB may carry a single symbol.

Also, a total system bandwidth of 20 MHz may be separated or divided into different frequency subcarriers 205. As illustrated in FIG. 2C, a single TTI is formed of 12 successive subcarriers, and an area(a time-frequency domain formed of 14 LBs in a time domain and 12 subcarriers in a frequency domain may be referred to as an RB.

For example, in 1 TTI, a bandwidth of 10 MHz may include 50 RBs in a frequency domain.

Each of lattices forming the RB may be referred to as a resource element (RE), and 168 (14×12=168) REs may exist in each subframe based on the structure described in the foregoing.

Figure 3:
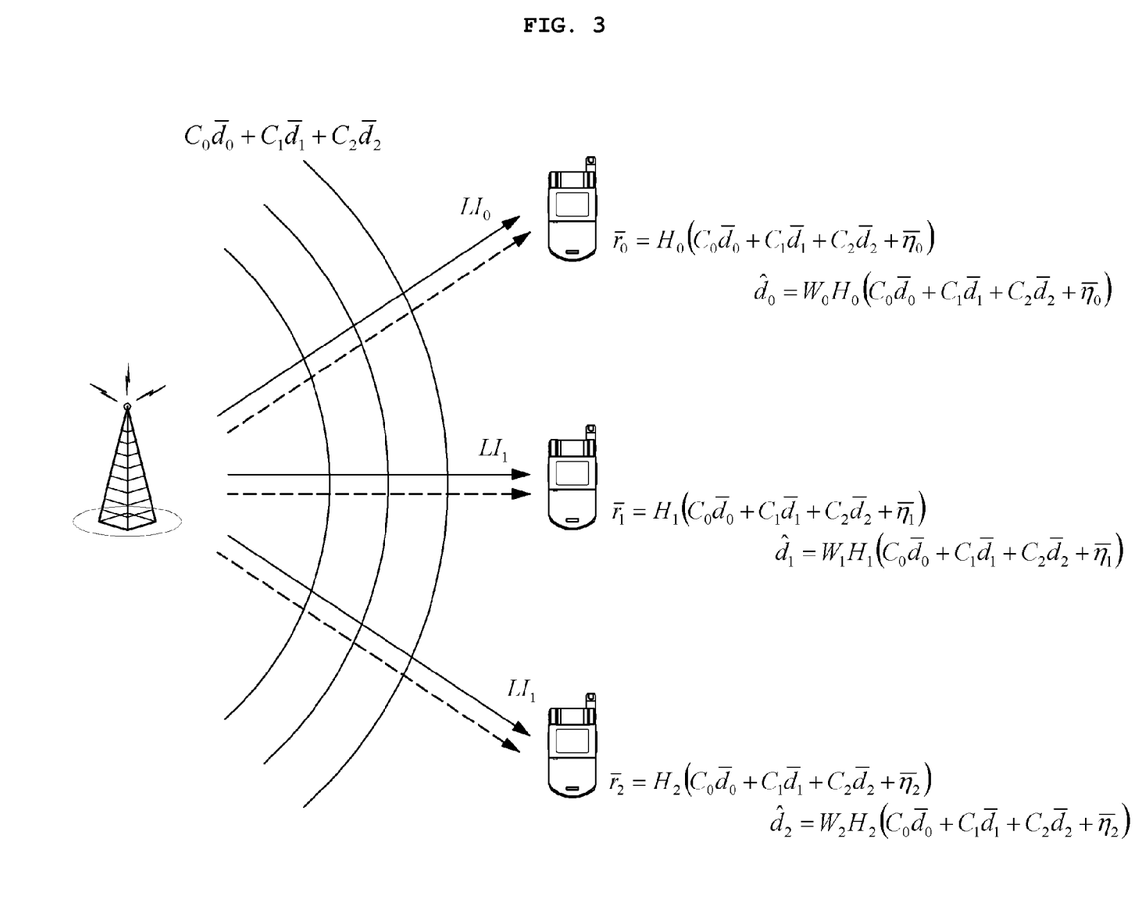
FIG. 3 is a diagram illustrating an example of signal transmission performed in a multi-user multiple input multiple output (MU-MIMO) system including three user equipments (UEs)

FIG. 3 illustrates an example of signal transmission performed in a multi-user multiple input multiple output (MU-MIMO) system including three UEs.

As illustrated in FIG. 3, a BS may transmit data $\overline{d}_0$, $\overline{d}_1$, and $\overline{d}_2$ precoded through use of precoders $C_0$, $C_1$, and $C_2$, to three UEs, that is, UE0, UE1, and UE2 respectively.

Also, a signal may be transmitted and received through use of the MIMO-antenna and thus, a transmitted signal $\overline{d}_i$ and a received signal $\overline{r}_i$ may be expressed by vectors.

In FIG. 2, $H_i$ and $W_i$ may correspond to a propagation channel with respect to a UEi and a matrix corresponding to a post-decoder to be used for signal restoration in the UEi. $\hat{d}_i$ denotes a estimated value $\overline{d}_i$ or a post-decoded value.

As shown in FIG. 3, the post-decoder $W_i$ may be determined based on a precoder $C_i$ and thus, UEi may restore information $\overline{d}_i$ when UEi is aware of the precoder $C_i$ used by a BS for UEi.

To transmit information associated with which precoder ($C_i$) is used by a BS for a UE, a DM-RS may be used. The DM-RS may be transmitted based on a scheme which will be described with reference to FIGS. 4 and 5.

The MIMO antenna may include a plurality of layers, and may be limited to rank 1 transmission (a number of layers=1) through rank 8 transmission (the number of layers=8) based on a number of used layers.

In general, a layer refers to an independent stream of simultaneously transmitted different pieces of information, and a rank refers to a number of layers or a maximum number of layers to be simultaneously transmitted.

As described in the foregoing, a transmitting apparatus may need to transmit, to a receiving apparatus, information associated with a precoder used by the transmitting apparatus. For this reason, a reference signal called a DM-RS may be used, and a DM-RS different for each layer may be transmitted to the receiving apparatus.

Accordingly, a DM-RS of each layer may need to be distinctively allocated to an RB provided in a structure as described in the foregoing. That is, it may need to be determined to which RE of the RB a DM-RS resource of each layer is to be allocated, which may be referred to as DM-RS patterning or DM-RS mapping.

There may be a discussion about a measure that allocates a DM-RS to a total of 12 REs for each RB in rank 1 and rank 2 transmission that use two or fewer layers, and that allocates a DM-RS to a total of 24 REs for each RB in at least rank 3 transmission that uses three or more layers.

Figure 4:
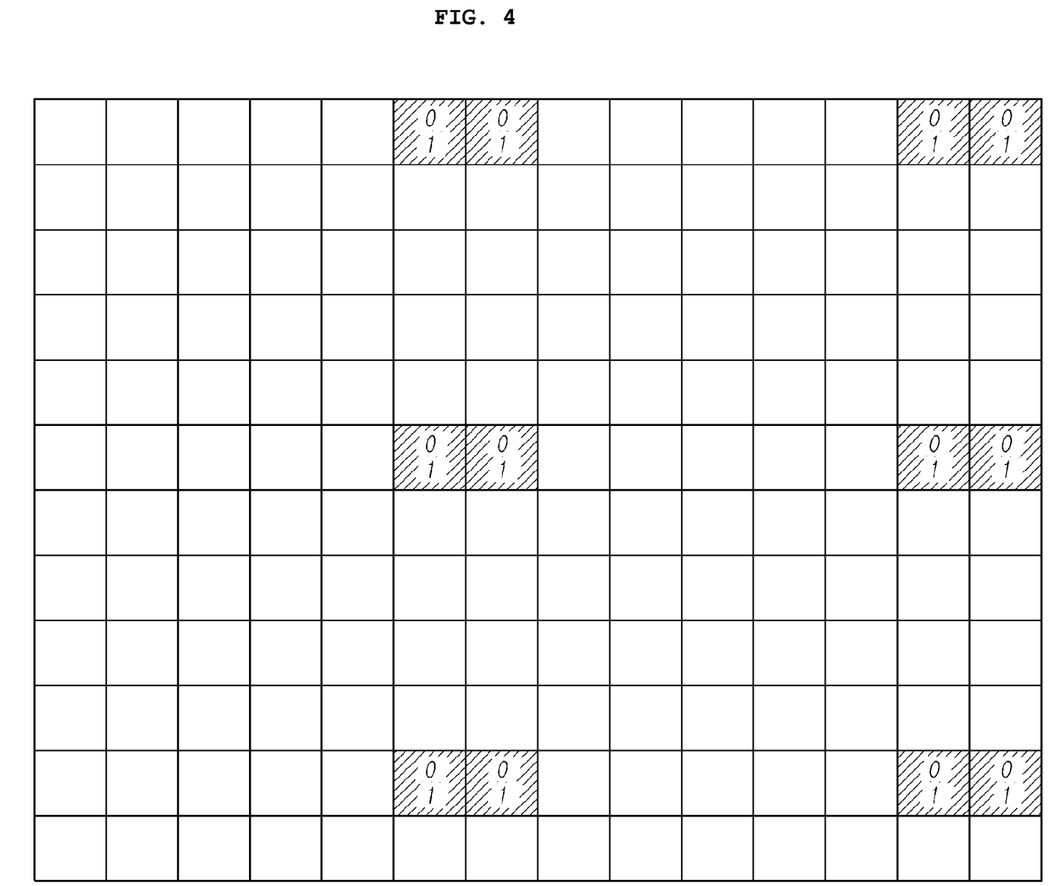
FIGS. 4 and 5 are diagrams illustrating an example of DM-RS mapping in rank 2 transmission or rank 4 transmission.
Figure 5:
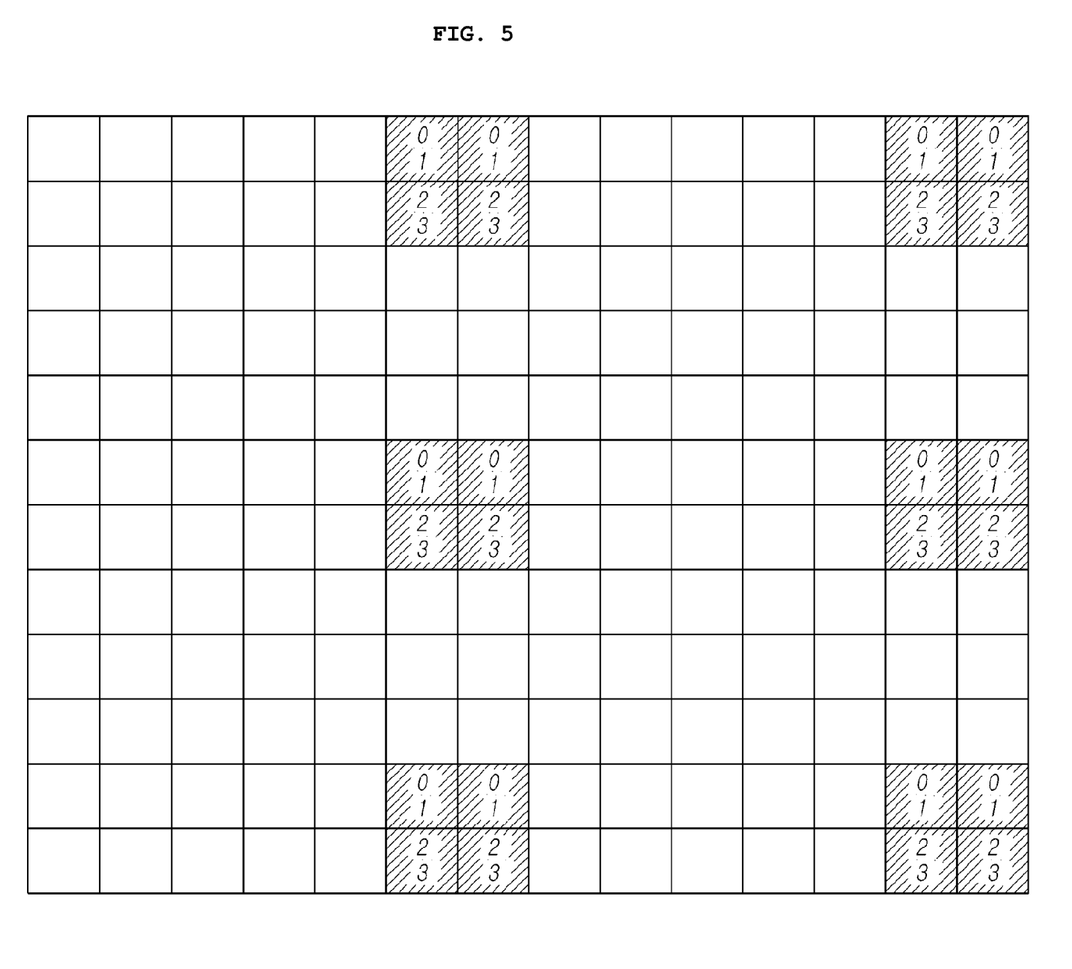

FIGS. 4 and 5 illustrate an example of DM-RS mapping in rank 2 transmission or rank 4 transmission, when DM-RS mapping or DM-RS patterning is performed as described in the foregoing.

That is, patterns of a DM-RS that is transmitted from a BS to a predetermined UE or that is transmitted from the predetermined UE to the BS are illustrated, and the pattern may correspond to a case where a number of layers that the UE receives or transmits is 2 or a case where the number of layers is 4.

A lattice unit may correspond to an RE to which a DM-RS is mapped, and the entire block may be expressed as a transmission block as a unit by which a DM-RS pattern is repeated.

A range illustrated in FIG. 3 shows neither a single transmission block nor the entire RB, but merely illustrates a limited area where a DM-RS is expressed.

The DM-RS pattern may be applied one time within a total bandwidth, and a predetermined pattern may be repeated in a frequency-axis.

In FIGS. 4 and 5, a number denotes a layer number of a transmitted layer, and an RE marked by a number denotes an RE to which a DM-RS corresponding to the number is allocated.

In FIGS. 4 and 5, when two numbers are included in a single RE, DM-RSs of two layers may be allocated to the corresponding RE, and the DM-RSs of the two layers may be distinguished by an orthogonal code, such as the Walsh code, the Hadamard code, and the like, a semi-orthogonal code, such as the Zedoff code and the like, or a random code that secures spreading gain. Hereinafter, a case where layers are distinguished through use of the Walsh code will be described, and it may also be embodied by the other orthogonal code, the semi-orthogonal code, and the random code described in the foregoing.

FIG. 4 illustrates an example of DM-RS mapping in rank 2 transmission, that is, the case where the number of layers is 2. A layer 0 and a layer 1 may be allocated to each of 12 REs redundantly, and DM-RSs of the two layers may be distinguished by the Walsh code.

FIG. 5 illustrates an example of DM-RS mapping in rank 4 transmission, that is, the case where the number of layers is 4. DM-RSs of a layer 0 and a layer 1 may be allocated to each of 12 REs redundantly, and DM-RSs of a layer 2 and a layer 3 may be allocated to each of 12 REs that are adjacent to the REs associated with the layer 0 and the layer 1. The DM-RSs redundantly allocated to each RE may be distinguished by the Walsh code.

Also, in FIGS. 4 and 5, an RE that is empty may correspond to a section where transmission data $\hat{d}_i$ or other information is transmitted.

Each UE that receives a transmitted DM-RS may measure the DM-RS so as to perform an information restoration process when the UE is aware of a layer received by the UE from among the layers.

Accordingly, as a separate signaling that transmits information associated with a layer allocated to each UE, a layer indicator $LI_i$ may be used as illustrated in FIG. 3.

When $UE_i$ detects a precoder $C_n$ that is used for transmitting information to another UE, $UE_i$ may recognize interference caused by the other UE, for example, $UE_n$, and thus, may provide additional information that may significantly improve performance of scheduling and multiple access control in the MU-MIMO environment.

In addition, when each UE is capable of recognizing, from a DM-RS, a layer that is used by each BS for transmitting information to a corresponding UE, a separate signaling may not be required for reporting the layer to the corresponding UE, overhead may be reduced, and information associated with accurate interference between UEs may be obtained. Therefore, information associated with more accurate multiple access interference may be provided to a BS or may be utilized by a UE.

To achieve the above description, an exemplary embodiment of the present invention may design a basic DM-RS sequence for one or more layers, and may add an additional parameter having N value or N events to the basic DM-RS sequence so as to generate N DM-RS sequences. Here, N is greater than or equal to 2.

Although generating and transmitting of the N DM-RS sequences is embodied in a BS and the like, it may not be limited thereto and may be applicable to all devices that are required to generate and transmit a reference signal (RS) for demodulation.

Although the N DM-RS sequences are used as DM-RS sequences for distinguishing UEs by being differently allocated to UEs, the N DM-RS sequences may not be limited thereto and may be utilized for any purpose that requires a plurality of DM-RS sequences.

Hereinafter, for a case where the N DM-RS sequences are used for distinguishing UEs, the N DM-RS sequences or N DM-RSs (signals) may be referred to as UE-specific DM-RS sequences or a UE-specific DM-RSs (signals).

Although the N DM-RS sequences are configured to be UE-specific DM-RS sequences according to exemplary embodiments of the present invention, it may not be limited thereto, as described in the foregoing.

Here, the additional parameter having N values or N events may be a UE-specific orthogonal code sequence, which will be described later.

A UE-specific DM-RS sequence may be generated as follows.

First, a UE-specific code sequence, which is orthogonal for each UE, may be generated. A basic DM-RS sequence for each layer and the UE-specific code sequence may overlap to each other and thus, the UE-specific DM-RS sequence may be generated. The UE-specific orthogonal code sequence may include an orthogonal code such as the Walsh code and the Hadamard code, a semi-orthogonal code such as the Zedoff code and the like, a random code that secures a spreading gain, and the like. Hereinafter, cases where the Walsh code is used as the UE-specific sequence will be described, and the other orthogonal code, the semi-orthogonal code, and the random code described in the foregoing may be also used.

Through use of the generated UE-specific DM-RS sequences, each UE may obtain a UE-specific DM-RS sequence for a corresponding UE and thus, may obtain precoder information used by a BS in each layer, which is basically provided by a DM-RS. Also, each UE may distinguish information associated with a layer assigned to a corresponding UE, and may distinguish precoder information and information associated with a layer allocated to another UE so as to obtain multiple access interference information among UEs.

This will be described below in more detail.

First, an example of patterning of a UE-specific DM-RS will be described. A basic DM-RS sequence of two or more layers that is distinguished by a layer-specific orthogonal code (Walsh code) may be allocated to each of at least one RE in an RB, a UE-specific orthogonal code sequence may be additionally allocated to the DM-RS sequence so as to generate a UE-specific DM-RS sequence, and the UE-specific DM-RS sequence may be transmitted.

Here, although it is desirable that the layer-specific orthogonal code may be a Walsh code having two or more digits, and the UE-specific orthogonal code sequence may be an $a^{th}$ sequence of a Walsh code having a length of c, it may not be limited thereto. Here, the length of the Walsh code corresponding to the UE-specific orthogonal code sequence, that is, c, may correspond to a concept of N as described in the foregoing, and may be an integer number that is greater than a number of UEs that simultaneously perform access.

That is, each bit of the $a^{th}$ sequence from among sequences of the Walsh code having the length of c may be sequentially allocated to a plurality of RE groups or RE sub-groups to which the basic DM-RS is mapped. In this example, a different Walsh code sequence may be used for each UE.

Referring to the basic DM-RS pattern of FIG. 4, in rank 2 transmission where two layers are used, each RE subgroup, to which a basic DM-RS sequence for a layer 0 and a layer 1 is allocated redundantly, may be formed of two REs, and the RE subgroups may be regularly mapped to a single transmission block (RB). Also, bits forming a UE-specific orthogonal code sequence may be sequentially allocated to the REs of each RE group and thus, a UE-specific DM-RS sequence may be generated for each UE.

Referring to a basic DM-RS mapping state of FIG. 5, in rank 4 transmission where four layers are used, each RE group to which a DM-RS is mapped may be formed of a first RE subgroup and a second RE subgroup, to which a basic DM-RS sequence for two layers distinguished by a layer-specific orthogonal code (Walsh code) is allocated redundantly. The RE groups may be regularly mapped to a single transmission block (RB), and bits forming a UE-specific orthogonal code sequence may be sequentially allocated to the REs of each RE group and thus, a UE-specific DM-RS sequence may be generated for each UE.

Throughout the specifications, the "RE group" indicates a total of 4 REs, to which two of DM-RSs for four layers may be mapped redundantly. The "RE subgroup" indicates a total of 2 REs, to which a DM-RS of each layer is mapped. Accordingly, in the rank 4 transmission, each RE group may be formed of a first RE subgroup including two REs to which a layer 0 and a layer 1 are allocated redundantly, and a second RE subgroup including two REs to which a layer 2 and a layer 3 are allocated redundantly. In the rank 2 transmission, only a first RE subgroup may exist, to which a layer 0 and a layer 1 are allocated redundantly.

Figure 6:
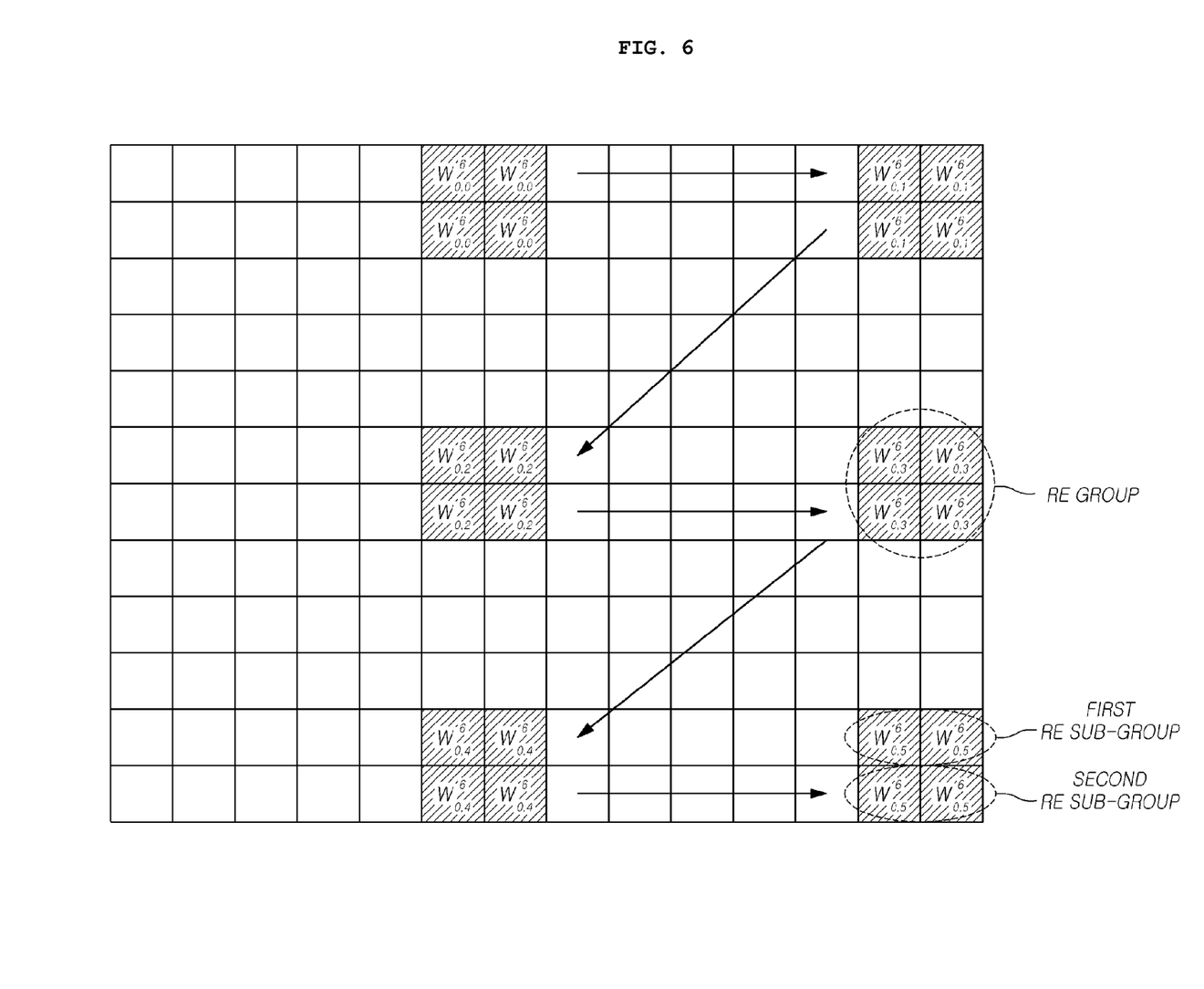
FIGS. 6 and 7 are diagrams illustrating allocation of a UE-specific orthogonal code sequence to a pattern of a basic DM-RS sequence of FIG. 5 according to an exemplary embodiment of the present invention.
Figure 7:
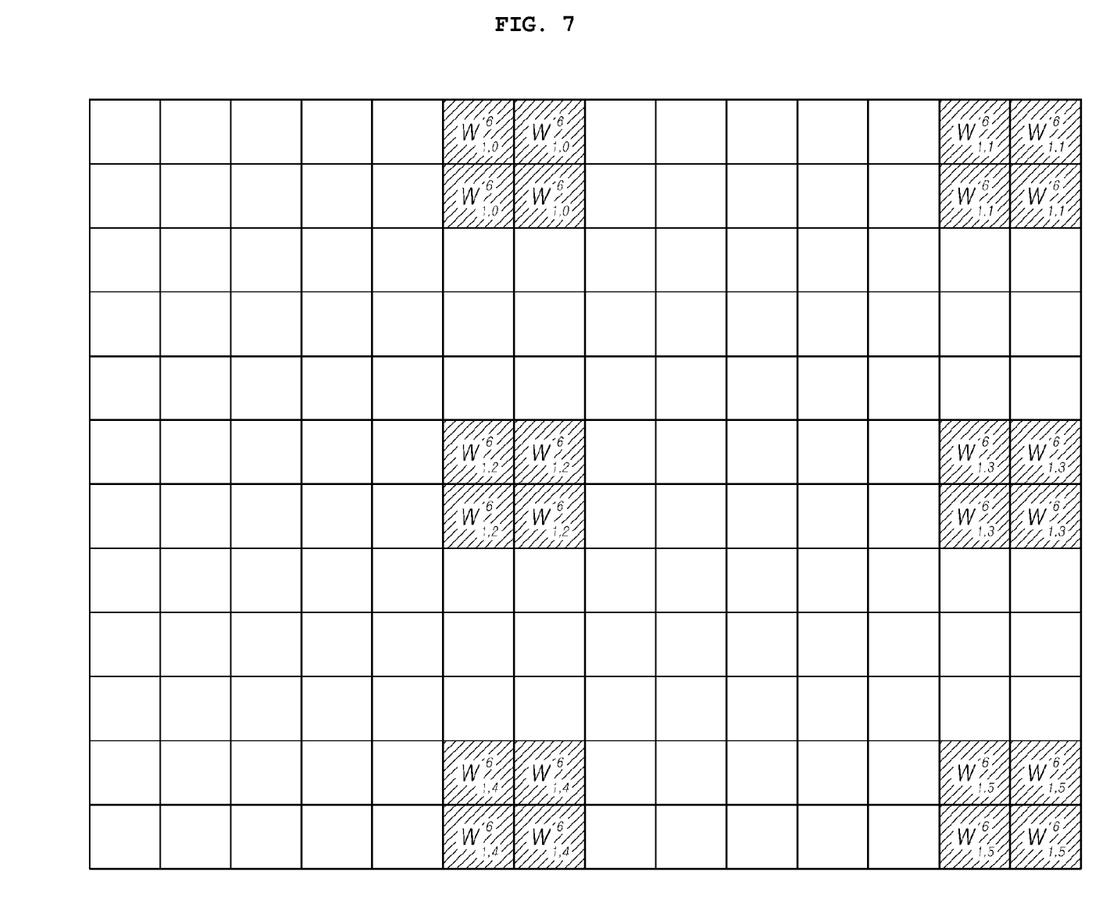

FIGS. 6 and 7 illustrate allocation of a UE-specific orthogonal code sequence to a pattern of the basic DM-RS sequence of FIG. 5 according to an exemplary embodiment of the present invention.

FIGS. 6 and 7 correspond to a case where a number of layers to be transmitted to each UE is 2. The DM-RSs of a layer 0 through a layer 3 may be transmitted, for example, a layer 0 and a layer 2 (the layer 1 and the layer 2, the layer 0 and the layer 3, or the like) may be allocated to UE0, and the layer 1 and the layer 3 (the layer 0 and the layer 3, the layer 1 and the layer 2, or the like) may be allocated to UE1.

First, since rank 4 transmission is performed, a pattern of a basic DM-RS sequence may be the same as FIG. 5, and numbers for distinguishing layers may not be included in FIGS. 6 and 7.

As shown in FIG. 6, bits forming a first sequence (i=0) from among Walsh code sequences having six digits, which is a UE-specific orthogonal code sequence to distinguish UE0, may be sequentially allocated to each RE group. That is, a first bit $W_{0,0}^6$ of the first Walsh code sequence may be allocated to a top-left RE group, a second bit $W_{0,1}^6$ of the first Walsh code sequence may be allocated to a top-right RE group, and a third bit $W_{0,2}^6$ of the first Walsh code sequence may be allocated to a middle-left RE group.

In this manner, when a corresponding bit of the UE-specific orthogonal code sequence is allocated to the rest of RE groups, an arrangement of the orthogonal code sequence for UE0 may be as shown in FIG. 6.

Although the bits of the UE-specific orthogonal code sequence is allocated in an order from the top-left to the top-right, and to the middle-left REs, it may not be limited thereto, and may be allocated in an order from the top-left to the middle-left, to a bottom-left, and to the top-right REs, and the like.

FIG. 7 illustrates an arrangement of the UE-specific orthogonal code sequence (Walsh code sequence) for distinguishing a second UE, that is, UE1, in the same manner as the above. Each bit ($W_{1,0}^6$ through $W_{1,5}^6$) forming a second sequence from among Walsh code sequences having 6 digits may be allocated in a similar manner to FIG. 6.

Figure 8:
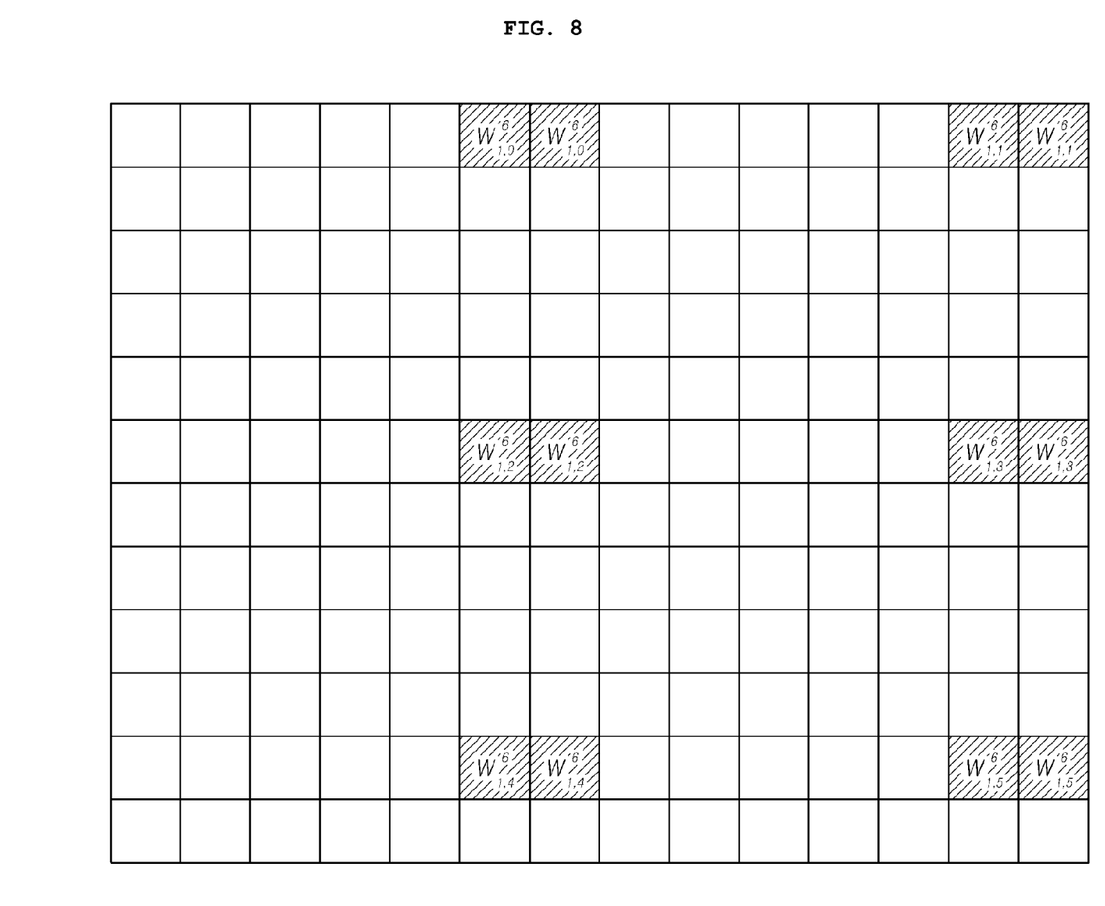
FIGS. 8 and 9 are diagrams illustrating allocation of a UE-specific orthogonal code sequence to a pattern of a basic DM-RS sequence when a number of layers transmitted to each of two UEs is one according to an exemplary embodiment of the present invention.
Figure 9:
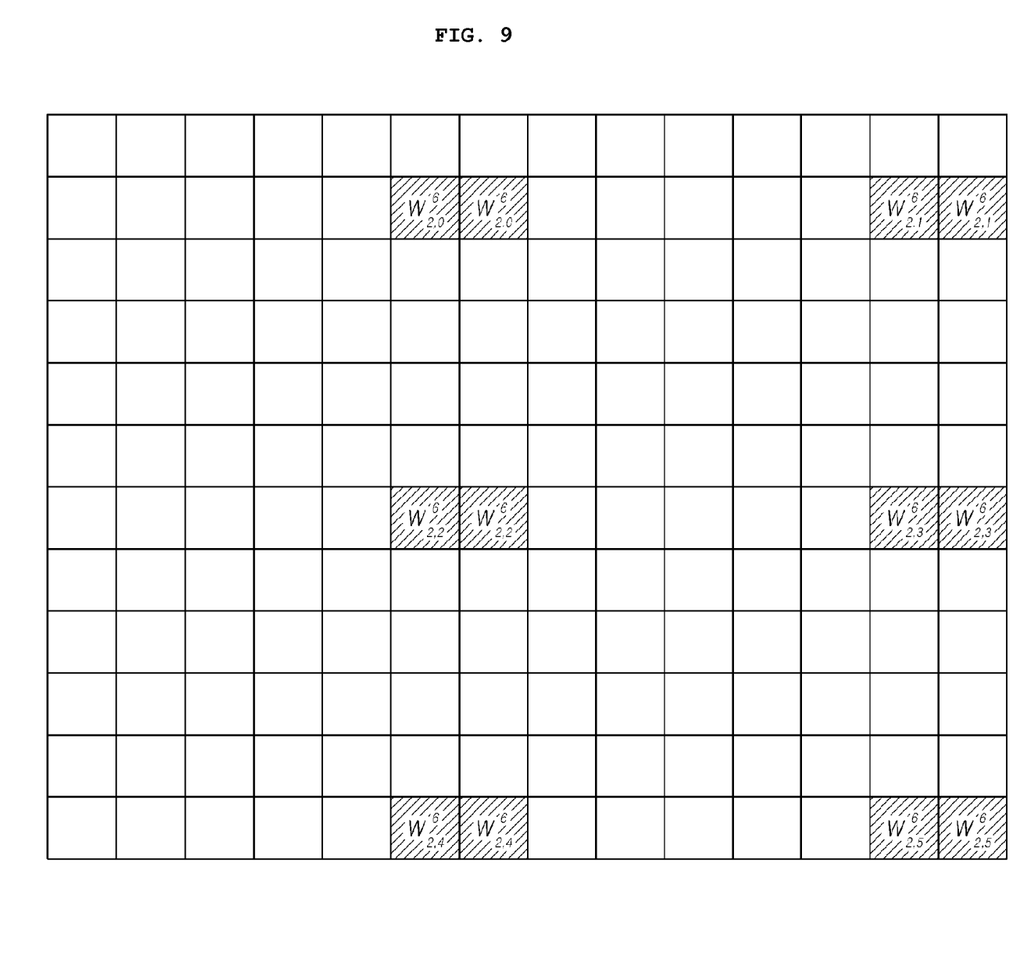

FIGS. 8 and 9 correspond to a case where a number of layers to be transmitted to each of two UEs is 1. A layer 0 or a layer 1 may be allocated to one UE, for example, UE0, and a layer 2 or a layer 3 may be allocated to the other UE, for example, UE1.

It is assumed that mapping of a basic DM-RS sequence with respect to each layer may be the same as FIG. 5 in exemplary embodiments of FIGS. 8 and 9, and numbers for distinguishing layers may not be included in FIGS. 8 and 9.

Unlike FIGS. 6 and 7, one layer is allocated to a single UE and thus, a corresponding bit of a UE-specific orthogonal code sequence may not need to be allocated to each of four REs forming an RE group, and bits of the UE-specific orthogonal code sequence may be allocated to only two REs, that is, an RE subgroup, to which a basic DM-RS sequence of a layer that is to be used by a corresponding UE is mapped.

For example, as illustrated in FIG. 8, the layer 0 or the layer 1 may be allocated to a first UE (UE0) and thus, bits of the UE-specific orthogonal code sequence (Walsh code sequence) may not be allocated to a second RE subgroup to which the layer 2 and the layer 3 are allocated. When mapping is performed in a manner that a first bit $W_{1,0}^6$ of the second Walsh code sequence may be allocated to a top-left first RE subgroup, a second bit $W_{1,1}^6$ of the second Walsh code sequence may be allocated to a top-right first RE subgroup, a third bit $W_{1,2}^6$ of the second Walsh code sequence may be allocated to a middle-left first RE subgroup, and the like, a pattern of the UE-specific orthogonal code sequence to distinguish UE0 may be formed as shown in FIG. 8.

In this manner, as shown in FIG. 9, bits of the UE-specific orthogonal code sequence (Walsh code sequence) are sequentially allocated to the second RE subgroups to which the basic DM-RS sequence for the layer 2 or the layer 3 is allocated.

FIG. 9 illustrates an example of allocating each bit $W_{2,0}^6$ through $W_{2,5}^6$) forming a third Walsh code sequence for UE1.

In FIGS. 6 through 9, an order of allocating each digit bit of the UE-specific orthogonal code sequence (Walsh code sequence) may be represented by arrows.

To put it briefly, according to the configuration described in the foregoing, a UE-specific orthogonal code sequence, that is, a UE-specific Walsh code sequence, and a basic DM-RS sequence designed to distinguish DM-RSs of two layers through use of a layer-specific Walsh code may be overlapped to each other, and a UE-specific DM-RS sequence may be generated and transmitted.

That is, the UE-specific DM-RS sequence may be configured by a layer-specific Walsh code sequence having 2 digits to be used for distinguishing layers and a UE-specific orthogonal code sequence (Walsh code sequence) to be used for distinguishing UEs, or more.

Each UE may receive a UE-specific DM-RS (signal) or a UE-specific DM-RS sequence, and may obtain information associated with a layer allocated to a corresponding UE and information associated with a layer allocated to another UE, and precoder information of each layer through performing the processes as follows.

First, each UE may perform correlation of corresponding layer-specific Walsh codes with respect to data of all layers (a total of 8 layers), so as to obtain a basic DM-RS sequence for each layer.

Next, when a UE-specific orthogonal code sequence (Walsh code sequence) allocated to each UE and the basic DM-RS sequence for each layer are correlated with respect to each layer, only a basic DM-RS sequence for a layer allocated to the UE may remain and DM-RS sequences for layers allocated to other UEs may become zero. Accordingly, information associated with the layer allocated to the UE, that is, the layer including a DM-RS value, and precoder information associated with the layer may be simultaneously obtained.

Also, when a UE-specific orthogonal code sequence (Walsh code sequence) allocated to another predetermined UE and the basic DM-RS sequence for each layer are correlated with respect to each layer, only values associated with the layers allocated to the corresponding UE may remain and values associated with layers allocated to other layers may become zero. Accordingly, information associated with the layer allocated to the other predetermined UE and precoder information associated with the layer may be simultaneously obtained.

Accordingly, each UE may receive and process a UE-specific DM-RS signal and thus, may recognize which layer is allocated to a corresponding UE and another UE, and precoder information of the layer.

As described in the foregoing, a communication UE or a UE according to the exemplary embodiment of the present invention may be a communication UE to obtain precoder information from an RS transmitted from a BS, and the UE may receive a UE-specific DM-RS sequence that is transmitted after being generated by additionally allocating a UE-specific orthogonal code sequence to an RE to which a basic DM-RS sequence for each layer is allocated, may generate a basic DM-RS sequence for each layer by correlating the received UE-specific DM-RS sequence and a layer-specific Walsh code sequence, and may correlate a UE-specific orthogonal code sequence (Walsh code sequence) allocated to the UE and the basic DM-RS sequence for each layer so as to obtain a layer allocated to the UE and precoder information used in the allocated layer.

Also, the communication UE may additionally obtain a second layer allocated to another UE and second precoder information used in the second allocated layer, through use of a UE-specific orthogonal code sequence (Walsh code) allocated to the other UE.

In the previous scheme, each UE needs to receive a separate signaling $LI_i$ to determine a layer allocated to a corresponding UE. However, the exemplary embodiment of the present invention provides an advantage in that each UE may determine a layer allocated to a corresponding UE based on a UE-specific orthogonal code sequence.

That is, in a case where only a pattern of a basic DM-RS sequence that is distinguished for each layer is used as illustrated in FIGS. 4 and 5, when a BS transmits a total of 8 layers and allocates a layer 0 and a layer 1 to a single UE, the BS may need to perform a separate signaling formed of three bits per allocated layer so as to report the allocated layer to the UE, in addition to transmitting of a basic DM-RS signal to the UE.

When the layer 0 and the layer 1 are allocated to the UE, a total of six bits overhead signaling may occur, including three bits (since the layer is one of the 8 layers) for reporting the layer 0 and three bits for reporting the layer 1. The signaling overhead may increase as a number of layers allocated to the same UE increases.

However, the exemplary embodiment of the present invention may design 8 UE-specific orthogonal code sequences since a maximum number of UEs that simultaneously perform access is up to 8, and may inform each UE of the UE-specific orthogonal code sequences in advance. In this example, as circumstances demand, a signaling may be transmitted through use of an RRC of L3, signaling schemes of other upper layers, or a separate control channel. Also, irrespectively of a number of layers allocated to each UE, information associated with an allocated layer may be transmitted to each UE with merely a signaling overhead of 3 bits, and simultaneously, information associated with a layer allocated to another UE may be transmitted.

Although a Walsh code sequence having 6 digits is used as a UE-specific orthogonal code sequence in the exemplary embodiments described with reference to FIGS. 6 through 9, a numbers of digits of the Walsh code sequence as the UE-specific orthogonal code sequence may not be limited thereto, and a length of the Walsh code sequence may vary based on a number of UEs that perform access, a total number of layers to be allocated, and the like.

For example, when a number of layers that a BS transmits is 8, a basic DM-RS sequence for each layer is transmitted through six REs within a single RB and thus, a length of a UE-specific orthogonal code sequence (Walsh code sequence) may be 3.

When the length of the UE-specific orthogonal code sequence is not sufficiently long, the UE-specific orthogonal code sequence may be mapped over a plurality of RBs.

Figure 10:
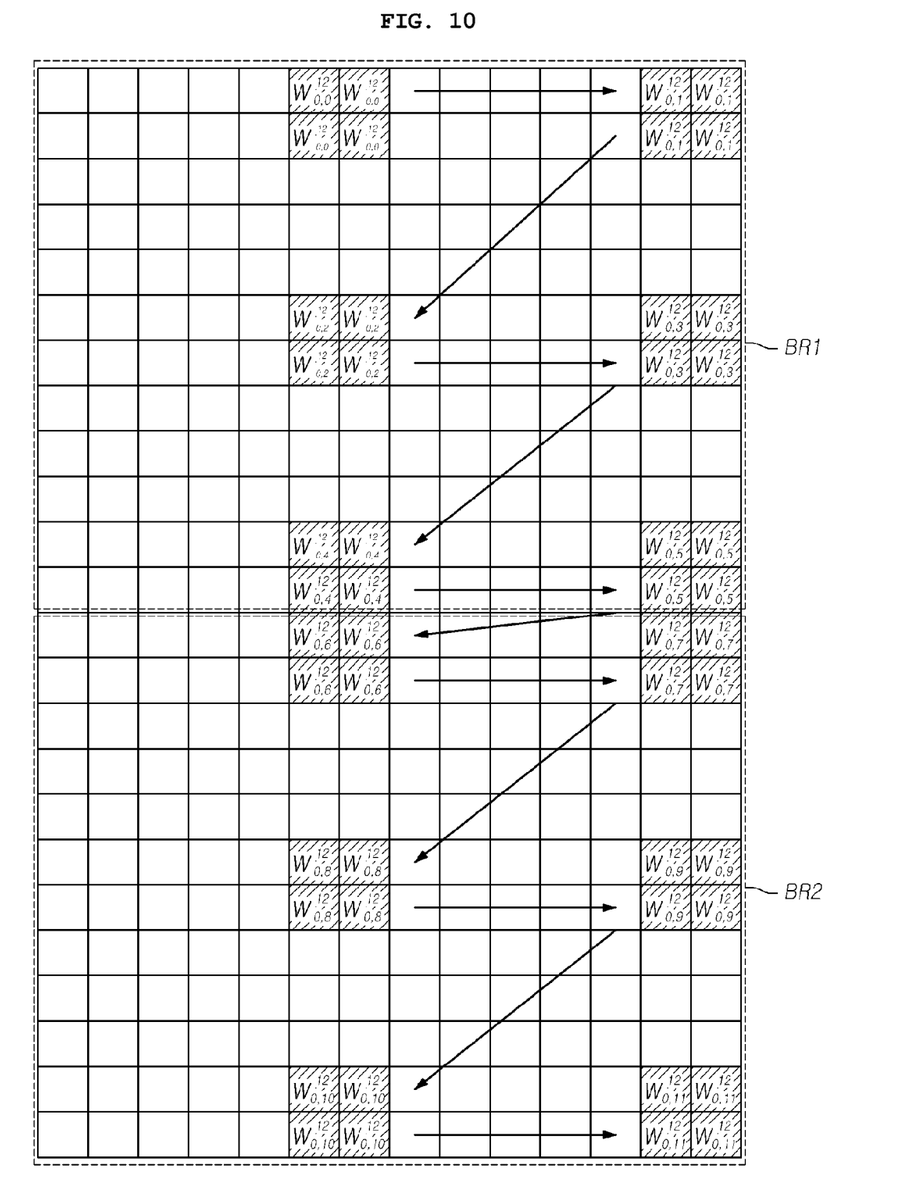
FIGS. 10 and 11 are diagrams illustrating a case where a UE-specific orthogonal code sequence is mapped over two resource blocks (RBs).
Figure 11:
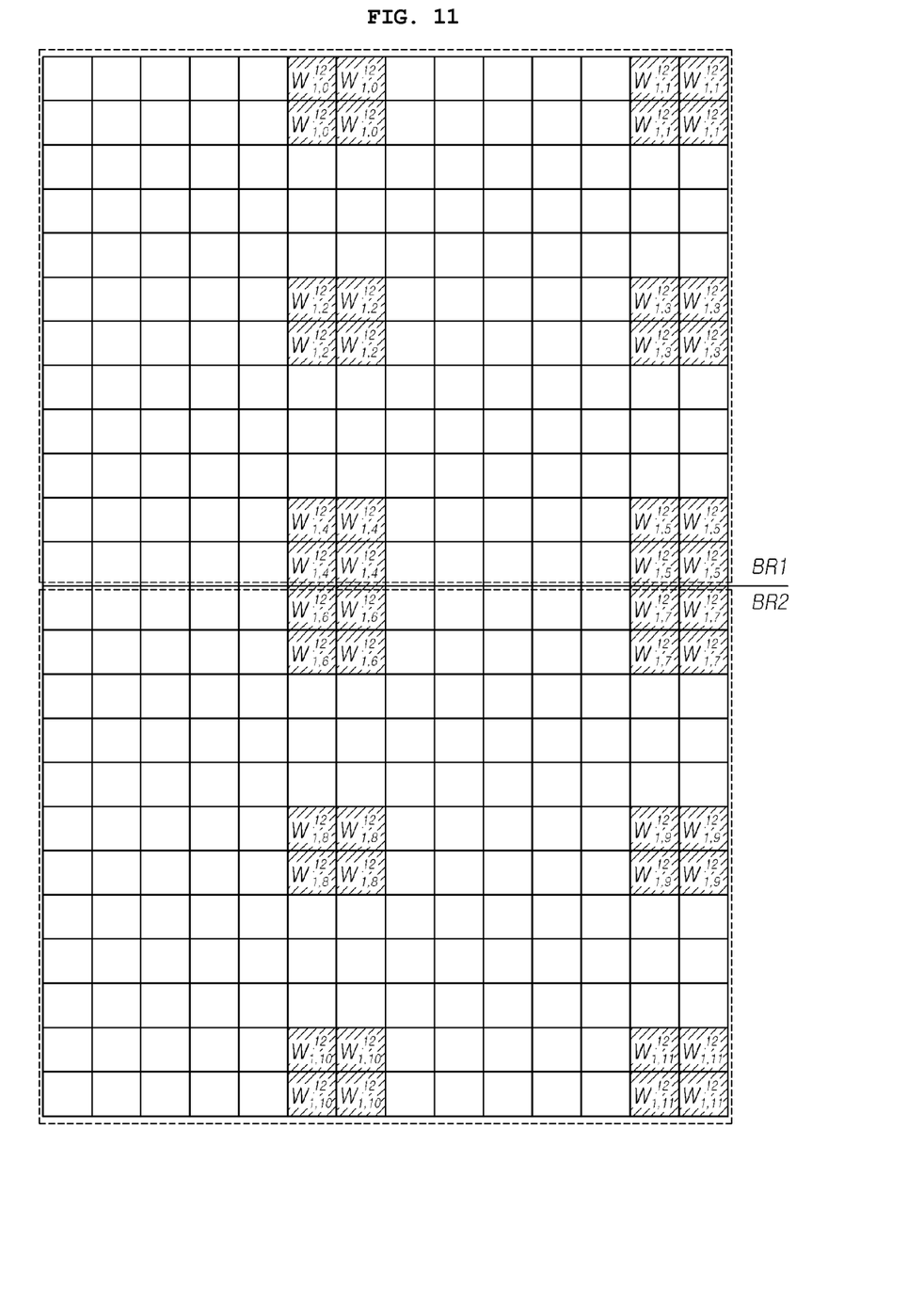

FIGS. 10 and 11 illustrate a case where a UE-specific orthogonal code sequence is mapped over two resource blocks (RBs), unlike the case where a UE-specific orthogonal code sequence is allocated to one RB as described with reference to FIGS. 6 and 9.

Referring to FIGS. 10 and 11, each bit of a UE-specific orthogonal code sequence having 12 digits, that is, a Walsh code sequence, may be sequentially allocated to a total of 12 RE groups of RB1 and RB2. In particular, in FIG. 10, for a predetermined single UE, each digit bit of a first sequence of a 12-digit Walsh code, that is, $W_{0,0}{}^{12}$ through $W_{0,11}{}^{12}$, is sequentially allocated to each RE group. In FIG. 11, for another UE, each digit bit of a second sequence of a 12-digit Walsh code, that is, $W_{1,0}{}^{12}$ through $W_{1,11}{}^{12}$, is sequentially allocated to each RE group. In FIGS. 10 and 11, an order of allocating each digit bit of a Walsh code sequence corresponding to a UE-specific orthogonal code sequence may be is represented by arrows.

That is, FIGS. 10 and 11 correspond to a case where the length of the UE-specific orthogonal code sequence is required to be longer such as a case where four layers are allocated to each of two UEs, and the like. To increase the length of the UE-specific orthogonal code sequence, the 12-digit Walsh code sequence may be allocated over two RBs. In this manner, when the UE-specific orthogonal code sequence is allocated over two RBs, the length of the UE-specific orthogonal code sequence may be extended to 12.

When a plurality of RBs is allocated to each UE for DM-RS transmission, the UE-specific orthogonal code sequence may be allocated to all RBs as described with reference to FIGS. 10 and 11, and as circumstances demands, the UE-specific orthogonal code sequence may be allocated to a few RBs or a single RB. Also, extending the length of the UE-specific orthogonal code sequence may increase a distance between sequences and thus, may discriminate the sequences.

According to the exemplary embodiments of the present invention, it has been described that a plurality of DM-RS sequences (N DM-RS sequences) is generated to be a plurality of UE-specific DM-RS sequences. However, the exemplary embodiment of the present invention may not be limited thereto, and may be construed to include designing a basic DM-RS sequence, and generating the N DM-RS sequences by adding an additional parameter having N values or N events to the basic DM-RS sequence, N being greater than or equal to 2.

According to the exemplary embodiments of the present invention, when a plurality of DM-RS sequences is generated, for example, for distinguishing UEs, each UE may obtain precoder information that a BS uses in each layer, which is basically provided from a DM-RS, and information associated with a layer allocated to a corresponding UE. In addition, each UE may obtain a layer allocated to another UE and precoder information. Accordingly, each UE may obtain multiple access interference information among UEs.

Therefore, a separate signaling for reporting information associated with an allocated layer to each UE may not be required and thus, overhead may be reduced.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A communication user equipment (UE) that obtains precoder information from a reference signal (RS) transmitted from a base station (BS), the UE performing:
    receiving of a UE-specific DM-RS sequence, which is transmitted after being generated by additionally allocating a UE-specific orthogonal code sequence to a resource element (RE) to which a basic DM-RS sequence for each layer is allocated;
    generating of the basic DM-RS sequence for each layer by correlating the received UE-specific DM-RS sequence and a layer-specific Walsh code sequence; and
    obtaining of a first allocation layer allocated to the UE and precoder information used in the first allocation layer, by correlating the generated basic DM-RS sequence for each layer and a UE-specific orthogonal code sequence allocated to the UE.

2. The UE as claimed in claim 1, wherein the UE further performs:
    additionally obtaining a second allocation layer allocated to another UE and second precoder information used in the second allocation layer through use of a UE-specific orthogonal code sequence allocated to the other UE.

3. A method of obtaining precoder information from a reference signal (RS) transmitted from a base station (BS), the method comprising the steps of:
    receiving a UE-specific DM-RS sequence that is transmitted after being generated by additionally adding a UE-specific orthogonal code sequence to a resource element (RE) to which a basic DM-RS sequence for each layer is allocated;
    generating the basic DM-RS sequence for each layer by correlating the received UE-specific DM-RS sequence and a layer-specific Walsh code sequence; and
    obtaining a first allocation layer allocated to a User Equipment (UE) and first precoder information used in the allocated layer, by correlating the DM-RS sequence for each layer and an allocated UE-specific orthogonal code sequence.

4. The method as claimed in claim 3, further comprising additionally obtaining a second allocation layer allocated to another UE and second precoder information used in the second allocation layer through use of a UE-specific orthogonal code sequence allocated to the other UE.

* * * * *